United States Patent [19]

Keizer

[11] 4,330,915
[45] May 25, 1982

[54] TECHNIQUE FOR UNIFORM STYLUS CONFIGURATION

[75] Inventor: Eugene O. Keizer, Princeton, N.J.

[73] Assignee: RCA Corporation, New York, N.Y.

[21] Appl. No.: 141,939

[22] Filed: Apr. 21, 1980

[51] Int. Cl.³ .................. B29D 17/00; B23P 17/00
[52] U.S. Cl. .................................. 29/169.5; 29/415
[58] Field of Search ............. 369/173, 170; 29/169.5, 29/411, 412, 415, 417, 469.5

[56] References Cited

U.S. PATENT DOCUMENTS

| | | | |
|---|---|---|---|
| 1,041,983 | 10/1912 | Edison | 369/173 |
| 1,396,412 | 11/1921 | Eldred | 369/173 |
| 1,914,658 | 6/1933 | Funk | 369/173 |
| 2,173,763 | 9/1939 | Olsen | 29/169.5 X |
| 2,960,759 | 11/1960 | Bondley | 29/169.5 |
| 3,049,790 | 8/1962 | Camras | 29/411 X |
| 3,080,640 | 3/1963 | Jochems | 29/411 X |
| 3,249,987 | 5/1966 | Duinker | 29/411 X |
| 3,383,752 | 5/1968 | Hukao et al. | 29/169.5 |

Primary Examiner—Ervin M. Combs
Attorney, Agent, or Firm—Birgit E. Morris; Donald S. Cohen; Thomas H. Magee

[57] ABSTRACT

A technique for manufacturing a uniform configuration for at least two video disc styli, each stylus having a shank and a tip at one end of the shank, comprising the step of attaching an edge of a first plate of shank material to one edge of a strip of tip material different from the shank material, the strip having a face thereof oriented along a predetermined crystallographic plane. The strip is cut into the individual tips while the plate remains attached to the strip. The plate is then separated into the individual shanks to form the separate styli, whereby the orientation of the crystallographic plane with respect to the shank is uniform for all styli.

21 Claims, 5 Drawing Figures

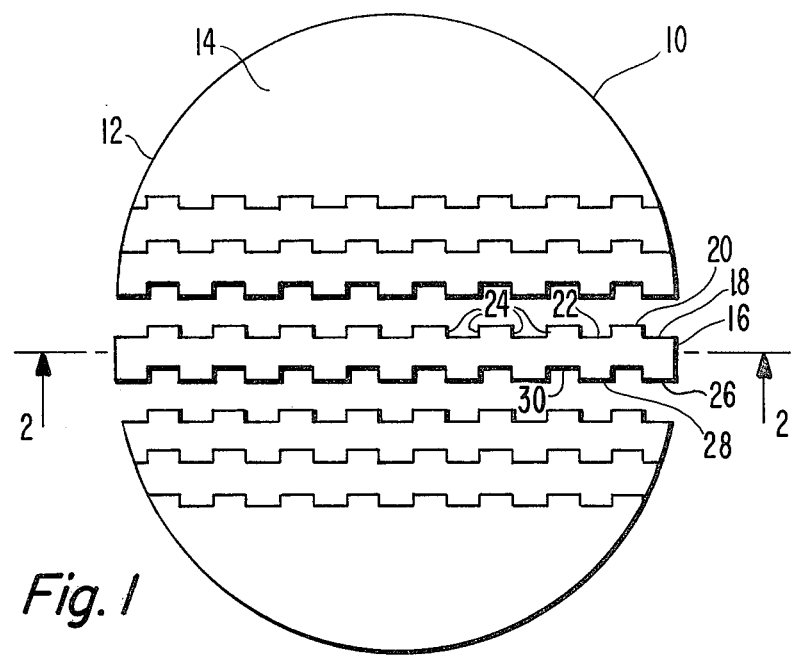
Fig. 1
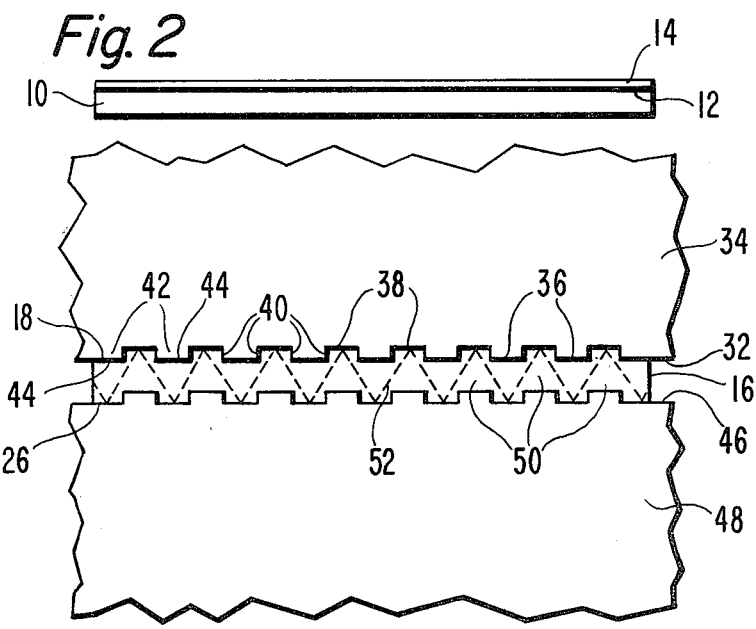
Fig. 2
Fig. 3

TECHNIQUE FOR UNIFORM STYLUS CONFIGURATION

This invention relates to a technique utilized for manufacturing a uniform configuration for a plurality of styli wherein the orientation of a predetermined crystallographic plane in the stylus tip, with respect to the stylus shank, is uniform for all styli.

BACKGROUND OF THE INVENTION

Information playback systems frequently utilize a stylus for reading signals from the surface of an information record, typically a plastic disc, that contains stored video and audio information. In some systems the information record has a fine spiral groove to guide the tip of a stylus that contains a thin electrode. In these systems, the stylus tip is made of a material having sufficient hardness to withstand the abrasion caused from tracking the groove. Materials which possess such hardness, for example diamond, generally have a crystallographic structure which presents surfaces exhibiting different qualities depending upon which crystallographic planes the surfaces are oriented along. Consequently, in manufacturing styli from these crystallographic materials for use in video disc playback systems, it is important to know and maintain the tip orientation during the various processing steps in order to achieve uniform styli of high quality.

The orientation of the stylus tip is usually controlled during processing by handling the longer and relatively larger shank of the stylus, at the end of which the tip is disposed. The stylus may be fabricated entirely from the crystallographic material, so that both the tip and the shank comprise one integral piece of material. In this case a planar surface of the shank, parallel to the shank axis, is formed along a predetermined crystallographic plane. Since the tip is fabricated from the same integral piece of material, the orientation of the tip may be controlled by utilizing the longitudinal surface of the shank for alignment. However, making a long-shanked stylus entirely from the same material may become expensive, particularly when the tip material, for example diamond, exceeds the cost of other suitable materials from which the shank can be made.

In order to reduce manufacturing costs, the shank of the stylus may be made from a different material which is less expensive than the crystallographic tip material. For example, a small diamond stone may be mounted at the end of a relatively long metallic shank, such as a cylindrical titanium rod. However, in the mounting process it is difficult to orient the diamond stone along a desired crystallographic plane with respect to the metallic shank, and to maintain this same orientation for a plurality of styli. The present invention provides a novel technique for manufacturing a plurality of styli having shanks made from a material different from the crystallographic tip material, whereby the orientation of the crystallographic plane in each tip with respect to the supporting shank is uniform for all styli.

SUMMARY OF THE INVENTION

The present invention comprises a technique for manufacturing a uniform configuration for at least two styli, each stylus having a shank and a tip at one end of the shank. The first step of the novel method comprises the step of attaching an edge of a first plate of shank material to one edge of a strip of tip material different from the shank material, the strip having a face thereof oriented along a predetermined crystallographic plane. The strip is cut into the individual tips while the plate remains attached to the strip. The plate is then separated into the individual shanks to form the separate styli, whereby the orientation of the crystallographic plane with respect to the shank is uniform for all styli.

BRIEF DESCRIPTION OF THE DRAWING

FIG. 1 is an exploded planar view showing the first step in the preferred embodiment of the present novel method.

FIG. 2 is a cross-sectional view taken along line 2—2 of FIG. 1.

FIGS. 3 through 5 are a series of planar views illustrating a succession of steps in practicing the present novel invention.

DETAILED DESCRIPTION OF THE INVENTION

Figure 4:
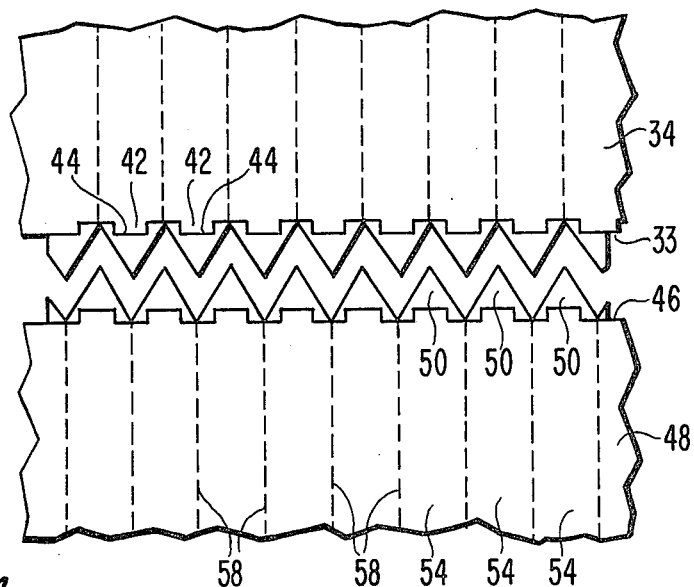

In FIG. 1 of the drawing, there is shown a slab 10 of material from which stylus tips are to be fabricated in accordance with the novel method of the present invention. The slab 10 is made of a material having a crystallographic structure, such as diamond, and may be formed as a slice cut from a diamond stone. For example, the slab 10 may be prepared by accurately orienting a natural diamond stone and sawing the slab 10 therefrom so that the slab 10 has a planar surface 12 oriented along a predetermined crystallographic plane, such as the (111) plane. Synthetic diamond could also be utilized, although the present technique is more applicable to the use of natural diamond where the individual stones are generally larger in size than the synthetic stones. Preferably, the slab has a thickness of about 0.012 inch (0.3 mm). In the present embodiment, the desired planar surface 12 is polished and, as a further preliminary step, a metallic layer 14 is deposited onto this polished surface 12, as shown in FIG. 2. The purpose of the metallic layer 14 is to ultimately act as a thin (about 0.2 $\mu$m) electrode for the stylus tips.

In the preferred embodiment of the present method, a strip 16 of tip material is formed from the slab 10 of tip material. Preferably, the slab 10 is cut into a plurality of strips of tip material. In the present example, one edge 18 of the strip 16 is formed by cutting along a path defining an edge with parallel mesa and valley surfaces 20 and 22 of equal predetermined length joined by surfaces 24 of equal predetermined height, as illustrated in FIG. 1. By repeating this cutting pattern, the strip 16 is formed having an opposite edge 26 with parallel mesa and valley surfaces 28 and 30 similar in pattern to the one edge 18, albeit 180 degrees out of phase since the mesa surfaces 20 are opposite the valley surfaces 30. The cutting steps may be performed by any suitable cutting means; in the present example these steps are done by laser cutting. Although the joining surfaces 24 are orthogonal to the mesa and valley surfaces 20 and 22 in the present example, the joining surfaces may be slanted inward towards the bottom of each mesa, so as to create a dovetail-like mortise in each valley.

An edge 32 of a first plate 34 of shank material is now attached to the one edge 18 of the strip 16 of tip material. The plate 34 preferably has a thickness similar to the thickness of the strip 16, and may comprise any suitable material, preferably a metallic material such as titanium. This attaching step may be performed simply by using an adhesive bonding material, such as an epoxy resin, between the edge 32 of the plate 34 and the one edge 18 of the strip 16.

In the preferred embodiment, the novel method further comprises the step of forming the edge 32 of the first plate 34 by cutting along a path defining an edge with parallel mesa and valley surfaces 36 and 38, as illustrated in FIG. 3. The mesa and valley surfaces 36 and 38 have lengths substantially equal to the predetermined length of the strip mesa and valley surfaces 20, 22, and are joined by surfaces 40 having heights substantially equal to the predetermined height of the joining surfaces 24 in the strip 16. Although the joining surfaces 40 of the plate 34 are orthogonal to the plate mesa and valley surfaces 36 and 38 in the present example, the joining surfaces 40 may be slanted inward so as to form a dovetail. The purpose in cutting a pattern for the edge 32 of the first plate 34, similar to the edges 18 and 26 of the strip 16 except that the pattern "polarity" is reversed, is to allow the plate 34 and strip 16 to be firmly attached to each other by a form of interlocking grooves.

Preferably, the attaching step is performed by press fitting the mesas 42 of the first plate 34 into the valleys 44 along the one edge 18 of the strip 16, whereby the mesas 42 and valleys 44 firmly interlock. In order to enhance the press fit, an adhesive material may be added between the plate 34 and the strip 16. If the joining surfaces 24 of the strip 16 and the joining surfaces 40 of the plate 34 are slanted, instead of being orthogonal to the mesa and valley surfaces, the attaching step may be performed in a manner such that the mesas dovetail with the valleys. Although only one form of interlocking pattern is illustrated in the drawing, the attaching step of the present invention encompasses other types of interlocking patterns to achieve a snug fit, such as triangular-shaped grooves.

In the present embodiment, the method further comprises the step of attaching an edge 46 of a second plate 48 of shank material to the opposite edge 26 of the strip, as shown in FIG. 3. The second plate 48 is similar in material and shape to the first plate 34, and may be attached in the same manner as the first plate 34 was attached to the strip 16.

The strip 16 is now cut into separate tips 50 while the plates 34 and 38 remain attached to the strip 16. In the preferred embodiment the step of cutting the strip 16 into the tips 50 is performed by laser cutting along a zigzag path connecting points located in the approximate middle of the mesa surfaces 20 and 28 disposed along the one and the opposite edges 18 and 26, as illustrated by dotted line 52 in FIG. 3. The two plates 34 and 48 are then separated from each other, as shown in FIG. 4. If the particular technique utilized to cut the strip 16 interferes with the previously deposited metallic layer 14, the tips may be metallized subsequent to this cutting step.

Figure 5:
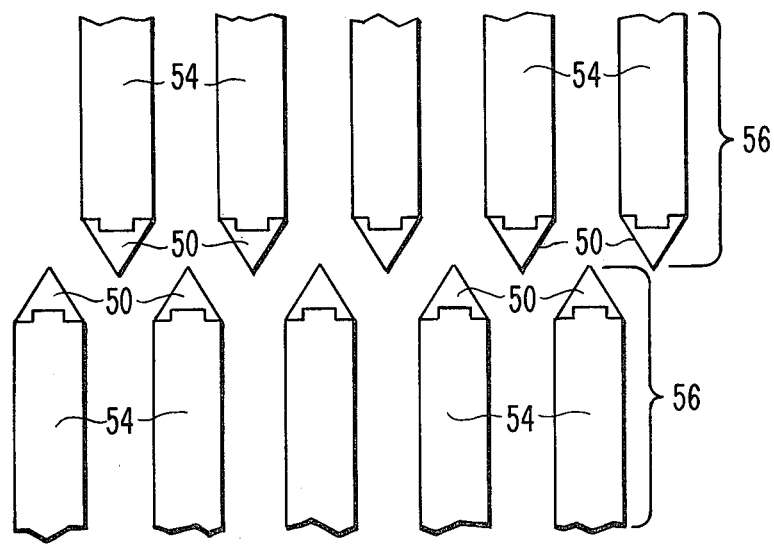

Each of the plates 34 and 48 is now separated into shanks 54 to form individual styli 56, as shown in FIG. 5. In the present example, this separating step is performed by cutting the plates 34 and 48 into the shanks 54 by laser cutting along the dotted lines 58 as shown in FIG. 4. By firmly attaching the strip material to the shank material initially before forming the individual styli 56, the orientation of the (111) crystallographic plane of each tip 50 with respect to the shank 54 is uniform for all styli 56. Consequently, the separate metallic-shanked styli 56 may now be mounted in a cartridge with assurance that the tip orientation is the same for all styli 56 and is thus capable of being accurately controlled during subsequent processing steps to achieve uniform styli 56 of high quality.

What is claimed is:

1. A method of manufacturing a uniform configuration for at least two styli, each stylus having a shank and a tip at one end of said shank, said tip being made from a material different from the material of said shank and having a crystallographic structure, comprising the steps of:

attaching an edge of a first plate of said shank material to one edge of a strip of said tip material, said strip having a face thereof oriented along a predetermined crystallographic plane of said tip material, cutting said strip into said tips while said plate remains attached to said strip, and separating said plate into said shanks to form said styli, whereby the orientation of said crystallographic plane with respect to said shank is uniform for said styli.

2. A method as recited in claim 1 further comprising the step of forming said strip of tip material from a slab of said tip material having a planar surface thereof oriented along said crystallographic plane.

3. A method as recited in claim 2 wherein said forming step is performed by cutting said slab into a plurality of strips of said tip material.

4. A method as recited in claim 2 wherein said one edge of said strip is formed by cutting along a path defining an edge with parallel mesa and valley surfaces of equal predetermined length joined by surfaces of equal predetermined height.

5. A method as recited in claim 4 further comprising the step of forming the edge of said first plate by cutting along a path defining an edge with parallel mesa and valley surfaces, said plate surfaces having lengths substantially equal to said predetermined length, and being joined by surfaces having heights substantially equal to said predetermined height.

6. A method as recited in claim 5 wherein said attaching step is performed by press fitting the mesas of said plate into the valleys of said strip, respectively, whereby said mesas and said valleys interlock.

7. A method as recited in claim 6 further comprising the step of adding an adhesive material between said plate and said strip.

8. A method as recited in claim 5 wherein said attaching step is performed by dovetailing said mesas with said valleys.

9. A method as recited in claim 5 wherein said separating step is performed by cutting said plate into said shanks.

10. A method as recited in claim 9 wherein said cutting steps are performed by laser cutting.

11. A method as recited in claim 2 wherein the planar surface of said slab is polished and oriented along the (111) crystallographic plane.

12. A method as recited in claim 11 further comprising the step of depositing a metallic layer onto the surface of said slab prior to performing said forming step.

13. A method as recited in claim 1 wherein said tip material is diamond and said shank material comprises a metallic material.

14. A method as recited in claim 13 wherein said tip material is synthetic diamond and said metallic material is titanium.

15. A method as recited in claim 1 further comprising the step of attaching an edge of a second plate of said shank material to an edge of said strip opposite said one edge.

16. A method as recited in claim 15 wherein both said one and said opposite edges of said strip are formed by cutting along a path defining an edge with parallel mesa and valley surfaces of equal predetermined length joined by surfaces of equal predetermined height orthogonal to said mesa and valley surfaces.

17. A method as recited in claim 16 further comprising the step of forming the edges of both said first and said second plates by cutting along a path defining an edge with parallel mesa and valley surfaces, said surfaces of both plates having lengths substantially equal to said predetermined length, and being joined by orthogonal surfaces having heights substantially equal to said predetermined height.

18. A method as recited in claim 17 wherein said attaching steps are performed by press fitting the mesas, along the edges of said first and said second plates, into the valleys of said one and said opposite edges, respectively.

19. A method as recited in claim 18 wherein the step of cutting said strip into said tips is performed by cutting along a zigzag path connecting points located in the approximate middle of the mesa surfaces disposed along said one and said opposite edges.

20. A method as recited in claim 15 wherein the face of said strip is polished and oriented along the (111) crystallographic plane.

21. A method as recited in claim 20 further comprising the step of depositing a metallic layer into the face of said strip prior to performing said cutting step.

* * * * *